March 6, 1934.  W. A. BURTON  1,950,225
SWITCH MECHANISM FOR ELECTRIC SIGNALING
Filed Sept. 17, 1928   2 Sheets-Sheet 1
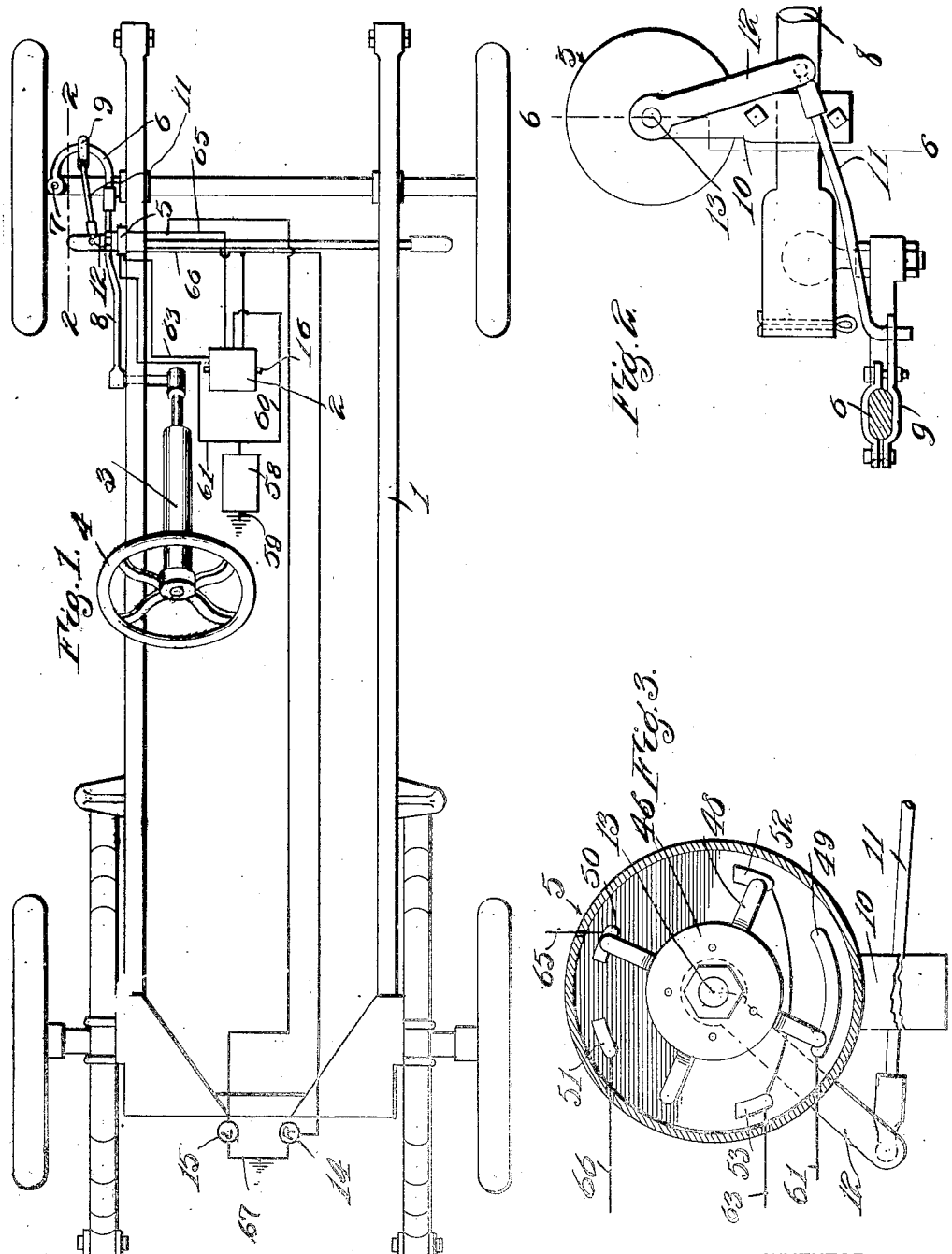
WITNESSES
INVENTOR
W. A. Burton
BY
ATTORNEY March 6, 1934.   W. A. BURTON   1,950,225
SWITCH MECHANISM FOR ELECTRIC SIGNALING
Filed Sept. 17, 1928   2 Sheets-Sheet 2
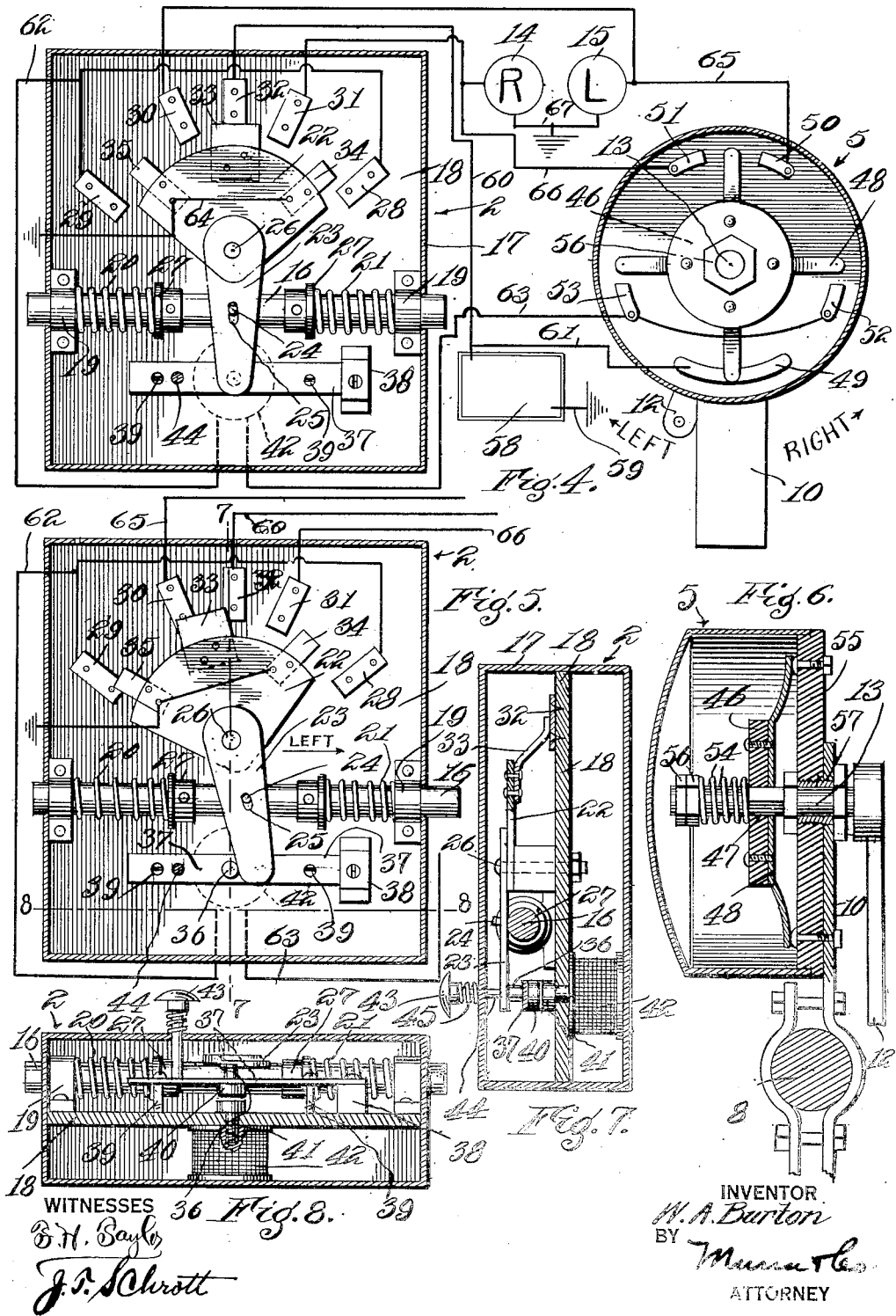
INVENTOR
W. A. Burton
BY
ATTORNEY Patented Mar. 6, 1934

1,950,225

UNITED STATES PATENT OFFICE 1,950,225

SWITCH MECHANISM FOR ELECTRIC SIGNALING

William A. Burton, Little Rock, Ark.

Application September 17, 1928, Serial No. 306,589

2 Claims. (Cl. 200—106)

This invention relates to improvements in electrical switches, and it consists of the constructions, combinations and arrangements herein described and claimed.

An object of the invention is to provide a switch mechanism particularly adaptable to the operation of certain direction signals of a motor vehicle, to which end a signal indicating a right or left turn is preliminarily given upon the formation of the intention, and when the turn is made the signal is caused to persist during the turn and automatically extinguished when the turn is completed.

Another object of the invention is to provide a switch mechanism in which certain components are respectively under direct and indirect manual control, in other words, there is one component directly within reach of the operator for the giving of the intended signal, and a second component so associated with the steering gear that when said gear is operated to make the desired turn, the action of the manual component is abrogated and said second component becomes active to maintain the signal until the turn is completed, whereupon it acts to extinguish the signal.

Another object of the invention is to provide a switch mechanism with means for cancelling a signal should the operator decide not to turn after giving the signal.

Other objects and advantages appear in the following specification, reference being had to the accompanying drawings, in which:

Figure 1 is a plan view of the chassis of a motor vehicle, the switch mechanism being shown applied and the electrical wiring being diagrammatically illustrated, Figure 2 is a cross section taken substantially on the line 2—2 of Fig. 1, illustrating the steering gear-component of the switch mechanism, Figure 3 is a sectional view of the steering gear switch, Figure 4 is a diagram of the switch mechanism in a normal or inoperative position, Figure 5 is a sectional view of the manual switch illustrating the position for indicating a left turn, Figure 6 is a section taken on the line 6—6 of Fig. 2, Figure 7 is a cross section of the manual switch taken substantially on the line 7—7 of Fig. 5, Figure 8 is a cross sectional view of the switch taken substantially on the line 8—8 of Fig. 5.

As has been indicated already, the device herein disclosed is concerned with the giving of certain signals in the operation of a motor vehicle. For the purpose of illustrating one use of the device it is herein employed for the giving of signals indicating right and left hand turns. An outstanding feature resides in several facts which are briefly stated.

The operator upon forming an intention to turn either to the right or left will appropriately position the plunger or what is now identified as the primary or manual switch, and he may then forget all about the signal. But it is by means of what is further identified as the secondary or steering gear-component that the signal is made to persist during the indicated turn and until the completion thereof, when the same component causes an automatic extinction of the signal.

It is thus that the operator is only concerned with initiating the signal. Having pushed the plunger in the proper direction he needs concern himself no further about the signal, leaving it to the mechanism to hold the signal for a proper length of time and then cause it to cease. This permits the operator to devote his attention to the more important business of guiding his vehicle with the probable traffic and through the intended turn. He is relieved of the necessity of extending his arm out of the window as well as of the possibility of some reckless motorist rushing by and causing him personal injury out of an improper desire to pass the vehicle in question.

There are also other advantages in the use of the mechanism. In order that the structure may be understood, reference is made to the drawings. The chassis 1 may be regarded as that of a motor vehicle, in fact of any vehicle upon which a switch mechanism such as this may find employment. The primary or manual switch is generally designated 2. This switch is located within convenient reach of the operator. The location thereof in Fig. 1 is not to be regarded as a restriction. The manual switch may be located on the toe boards, or it may be located on the steering column 3 within convenient reach of one or the other of the two hands on the steering wheel 4. In any case the manual switch is subject to personal operation by the operator.

The secondary switch, generally designated 5, is located remotely from the operator. In this instance it is associated with the steering gear, and so much of the steering gear as is concerned with the secondary switch 5 comprises the following: The thrust arm 6 of the steering knuckle 7 is rocked back and forth by a drag link 8 upon an operation of the steering wheel 4. This motion of the thrust arm is transmitted to and employed for the operation of the secondary switch 5.

For these purposes, a clamp 9 is attached to the arm 6. A clamp bracket 10 is used to secure the switch 5 to the drag link 8. A link 11 is pivotally connected with the clamp 9 and with a lever 12 of the switch 5, so that a turning of the thrust arm will rock the lever and turn the shaft 13 to the exposed end of which the lever is attached.

In steering the front wheels of the vehicle there will be some difference in motion between the thrust arm 6 and the drag link 8, and this difference in motion is taken advantage of for the operation of the lever 12. Either a push or a pull will be imparted to the lever 12 through the connecting link 11 and it is by means of either the push or pull that the movable element of the secondary switch 5 is shifted into either one position or the other. The action attending the shifting of said element into one position is described under the operation of the mechanism.

A signal is made to appear in either the right or left signal casing 14 and 15 in the following manner: A plunger 16 extends across the manual switch 2 and has the ends protruding from opposite sides of the casing 17. A base board or partition 18 in the casing provides a common support for a number of elements of the mechanism, and for brackets 19 in particular, in which the plunger has bearing. The protruding right and left ends of the plunger appear to an observer as buttons, which, in practice, would be appropriately designated as right and left switch buttons. A pressure on the left end of the plunger, or the left button, will operate the left signal 15.

Light springs 20 and 21 are intended to keep the plunger 16 as well as an insulating switch segment 22 in a central position. The segment has a fixedly attached lever 23 which has connection with the plunger 16 through a pin 24 and slot 25. The switch segment and lever are pivoted at 26 on the partition 18. The springs 20 and 21 respectively abut the brackets 19 and collars 27 on the plunger. The collars are adjustable so that the tension of the springs can be regulated with the ultimate purpose of centralizing the position of the switch segment and lever as already stated.

Mounted on the partition 18 is a series of contact plates 28, 29, 30, 31 and 32. The insulating segment 22 has a series of co-acting contactors 33, 34 and 35. The switch lever 23 is engageable with either side of a catch 36 on the upper side of a trip spring 37 (Figs. 7 and 8). The spring 37 is a leaf spring which is situated in the free end of the lever 23 so as to be traversed by said free end when the lever is shifted. The lever 23 will assume a central position over the catch when the switch 2 is inactive as in Fig. 4 but will be held in either shifted position by the catch when the plunger 16 is actuated. The catch is part of an armature as presently appears. One end of the trip spring is attached to a block 38 which holds the spring at a proper level.

The tendency of the spring will be to bend upwardly, but in order to maintain the spring in a proper position, as well as to adjust the tension thereof it is pierced by a pair of adjusting screws 39. The heads of these bear on top of the spring and by properly manipulating the screws the position of the trip spring can be accurately maintained. A pressure on one end of the plunger 16 will swing the lever 23 on its pivot, and by virtue of the function of the catch 36 the arm will be held after the finger pressure on the plunger is released.

On the under side of the trip spring there is an armature 40. A reduced continuation of the armature passes through the trip spring and constitutes the catch 36 previously referred to. The head of a screw 41 which holds a magnet 42 in position against the under side of the partition 18, serves as a pole piece, and will attract the armature 40 when the magnet is energized. The attraction of the armature will release the catch 36 from the lever 23, (assuming the lever to be in a shifted position) so that the switch arm 23 and its appurtenances can fly back to their original central position. One or the other of the springs 20 and 21 then supply the necessary energy.

A release button 43 provides for a manual depression of the spring 37 and release of the catch 36 in the event that the operator experiences a change of intention after having set the manual switch 2 for either a right or left hand turn. The stem 44 (Fig. 7) of this button will be made to bear against the top of the spring 37. A light coil spring 45 is intended to keep the button 43 in a raised position above one side of the casing 17. By pressing on the button 43, the trip spring 37 will be deflected the same as it would be by the foregoing action of the magnet 42, so that the catch 36 will be released and the arm 23 permitted to move back to normal position as before.

The detailed construction of the secondary switch 5 is as follows:— An insulating washer 46, mounted on the square or other non-circular part 47 of the shaft 13, carries a metallic spider 48, the four fingers of which are so positioned as to co-act with a series of contactor plates 49, 50, 51, 52 and 53. The first of these is otherwise known as the battery plate. The plates 50 and 51 are identified as the left and right signal casings. The plates 52 and 53 are common to the magnet 42.

A spring 54 presses against the washer 46 and keeps the fingers of the spider in engagement with the insulating base 55 of the switch 5 and with the contact plates thereon. The spring is held on the shaft by lock nuts 56. The shaft turns in a bushing 57 at the place where it passes through the insulating base. The bushing serves the additional purpose of holding an arm of the clamp bracket 10. The circuits in which the signal casings 14 and 15 and the primary and secondary switches 2 and 5 are situated are as follows: A battery 58, which may be the automobile battery, furnishes the necessary current. One terminal of the battery is grounded to the chassis by a ground wire 59. The other terminal has a wire 60 which connects with the contact plate 32 of the switch 2. A branch 61 of that wire joins with the battery plate 49 of the switch 5.

A wire 62 commonly connects the contact plates 28 and 29 of the switch 2 and is connected with one terminal of the magnet 42. The other terminal of the magnet is connected by means of a wire 63 with both magnet contact plates 52 and 53. A ground wire 64 commonly connects the contactors 34 and 35.

The left contact plate 30 of the switch 2 is connected by means of a wire 65 with one side of the left signal 15 and with the contact plate 50 of the switch 5. Similarly, the contact plate 31 is connected by means of a wire 66 with one side of the right signal 14 and with the contact plate 51. The remaining sides of the signals have a common ground connection 67.

The operation is readily understood. Assume that the vehicle is moving on a straight away course. The operator forms an intention to make a left turn. Suiting the intention he will press the left button of the primary switch 2 so that the internal mechanism of the switch assumes the position in Fig. 5. It will be remembered that the so called left and right buttons of the primary switch 2 comprise the protruding ends of the plunger 16.

Having pressed the button and moved the plunger 16 into the position in Fig. 5, current will flow as follows: from battery 58, over wire 60, central contact plate 32, contactor 33, contact plate 30, wire 65, left signal 15 and common ground connection 67 back to the battery by way of ground wire 59. The left signal 15 is thus lighted, it being assumed that the casing contains an ordinary lamp bulb. The movable switch element consisting of the segment 22 and arm 23 will be maintained in the shifted position (Fig. 5) by the tension of the trip spring 37 and the catch 36.

Now assume that the operator has reached the place where the left turn is to be made. The steering wheel 4 is turned accordingly. The thrust arm 6 will be swung forwardly and outwardly and by virtue of the difference in motion between the thrust arm and the drag link 8, the connecting link 11 will be caused to pull on the lever 12 and rock the spider 48 from the normal position in Fig. 4 to the shifted position in Fig. 3.

Keeping in mind that the primary switch 2 is still in the position in Fig. 5, and that the secondary switch 5 is now in the position in Fig. 3, current will flow as follows: from battery 58, over branch wire 61 to the battery plate 49, spider 48, to contact plate 52, wire 63 to magnet 42, wire 62 to contact link 29, contactor 35 and back to the battery by way of ground wires 64 and 59.

The resultant energization of the magnet 42 attracts the armature 40 and flexes the trip spring 37 so that the catch 36 is displaced from the side of the lever 23. The lever 23 being released will permit the spring 21 to shift the movable switch elements 22, 23 to the original position (Fig. 4) so that the circuit by which current was formerly supplied to the signal is broken. But the signal 15 persists nevertheless because current is furnished thereto over another circuit defined as follows: from battery 58, over wire 61, plate 49, spider 48, plate 50, a portion of wire 65 to the signal 15, and back to the battery by way of common wires 67 and 59.

This condition will remain as long as the operator holds the vehicle to the turn. As soon as he straightens out, that is to say, turns the steering wheel 4 to reassume the straight away course, the action will be to restore the secondary switch 5 to the original position in Fig. 4. The circuit last described will then become broken at the contact plate 50, as will also the magnet circuit at the contact plate 52. It is observed that the battery plate 49 is of sufficient length that the bottom finger of the spider 48 will always remain in engagement therewith regardless of the turning of the switch. The contactor 33 of the switch 2 is a bridging contactor. It is broad enough to cover a pair of plates 30, 31 and 32. In giving a left turning signal it will bridge the plates 30 and 32 (Fig. 5) as already described, and in giving a right signal will bridge the plates 31 and 32.

Inasmuch as the giving of a right signal involves a mere reversal of the foregoing actions it is deemed unnecessary to describe the details of that function. In summing up it is to be borne in mind that an intention to make a turn is concluded by pressing on one or the other of the two ends of the shaft 16. This initiates the signal. The making of the turn relieves the movable switch element of the switch 2 which initiated the signal yet permits the signal to persist until the vehicle is again straightened out, whereupon the signal is automatically extinguished.

Although the secondary switch 5 is primarily intended to co-act with the manual switch 2 in the manner brought out above, yet it is capable of an independent function in indicating left and right turns of the vehicle. Assume, for example, that the vehicle is standing at the curb and the driver turns the steering gear to the left to move out into the street.

A circuit will be completed as follows:—From battery 58, over wire 61, plate 49, spider 48, contact plate 50, wire 65, left signal 15 and back to the battery by way of ground wires 67 and 59. A similar operation would follow a right turn.

While the construction and arrangement of the improved switch mechanism is that of a generally preferred form, modifications and changes may be made without departing from the spirit of the invention or the scope of the claims.

I claim:—

1. A switch having a movable switch element therein comprising a contactor segment and a lever, a plunger connected with the lever to move the element, the ends of the plunger providing buttons either one of which is to be pressed for shifting the plunger, resilient means tending to neutralize the plunger and to keep the element in a circuit-opening position, a leaf spring over which the lever plays and which has a catch to hold the lever upon its being shifted from its neutral position consequently to hold the switch element in a circuit-closing position against the tension of said resilient means, and electro-magnetic means to attract and flex said spring thus to displace the catch and release the lever and enable the resilient means to again neutralize the plunger and restore the element to the circuit-opening position.

2. A switch having a movable switch element therein comprising a contactor segment and a lever, a plunger connected with the lever to move the element, the ends of the plunger providing buttons either one of which is to be pressed for shifting the plunger, resilient means tending to neutralize the plunger and to keep the element in a circuit-opening position, a leaf spring over which the lever plays and which has a catch to hold the lever upon its being shifted from its neutral position consequently to hold the switch element in a circuit-closing position against the tension of said resilient means, electro-magnetic means to attract and flex said spring thus to displace the catch and release the lever and enable the resilient means to again neutralize the plunger and restore the element to the circuit-opening position, and a stem bearing against the spring for its manual displacement independently of said electro-magnetic means.

WILLIAM A. BURTON.